(No Model.)
D. McMAHON.
LAMP HANGER.
No. 331,521. Patented Dec. 1, 1885.
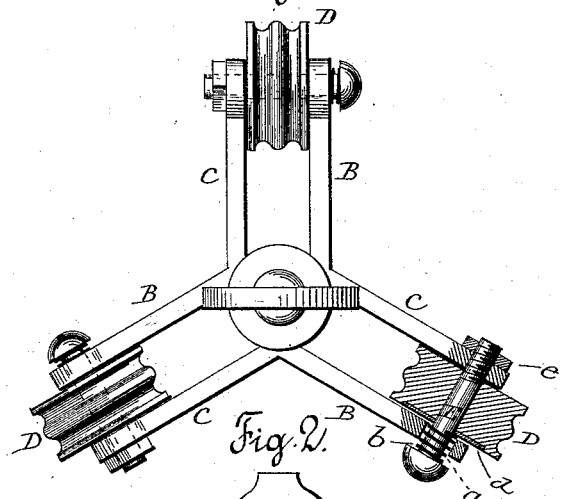
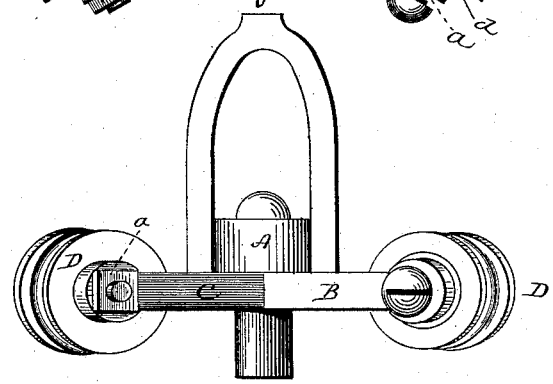
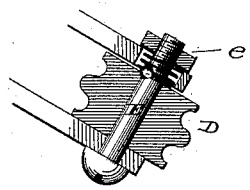
Witnesses.
Dennis McMahon.
Inventor.
By Atty.

UNITED STATES PATENT OFFICE.

DENNIS McMAHON, OF MERIDEN, CONNECTICUT, ASSIGNOR TO THE BRADLEY & HUBBARD MANUFACTURING COMPANY, OF SAME PLACE.

LAMP-HANGER.

SPECIFICATION forming part of Letters Patent No. 331,521, dated December 1, 1885.

Application filed August 17, 1885. Serial No. 174,579. (No model.)

*To all whom it may concern:*

Be it known that I, DENNIS MCMAHON, of Meriden, in the county of New Haven and State of Connecticut, have invented a new Improvement in Lamp-Hangers; and I do hereby declare the following, when taken in connection with accompanying drawings and the letters of reference marked thereon, to be a full, clear, and exact description of the same, and which said drawings constitute part of this specification, and represent, in—

Figure 1, a top view of the hanger complete as adapted to a three-chain weight fixture; Fig. 2, a side view of the same; Figs. 3 and 4, modifications.

This invention relates to an improvement in the hanger adapted to be secured to the ceiling, and over which chains run for the support of a lamp-fixture, and which is made adjustable by such chains to different elevations. As the weight of the movable part of the fixture varies to a considerable extent, owing to different weights of lamp-founts, chimneys, shades, or to the quantity of oil in the fount, it follows that if the weights or springs by means of which the lamp is adjusted are of a fixed power the movable part of the fixture will be raised by that power, should it not be of a certain weight, so that the highest elevation would be substantially the only point where the fixture would rest; and, on the other hand, should the movable part of the fixture be heavier than the lifting power can support, then the movable part of the fixture will run down, and the lowest point of support will be the only position of rest. It is therefore necessary to provide some means to accommodate this variation of weight. To this end friction has been applied to the pulleys over which the chains or cords run from the spring to the fixture, or from weights to the fixture, according to the class of hanger, by springs usually arranged to bear upon one or both sides of the pulleys, and between the cheeks of the hanger-frame and the pulleys; but when so applied adjustment of the friction is difficult. As generally constructed the spring introduced produces the maximum amount of friction necessary, so that a very considerable variation in the weight of the movable part of the fixture may be made without the difficulty before mentioned. It is desirable, however, that this friction shall be adjusted, in order that there may be only sufficient friction for the proper working of the movable portion of the fixture. Devices have been provided whereby the applied friction may be adjusted, but such are more or less complicated.

The object of my invention is to provide an adjustable friction device which shall be simple and cheap in construction, yet effective in operation; and it consists in the construction hereinafter described, and particularly recited in the claims.

In illustrating my invention I show it as applied for a three-chain fixture, and in which the supporting device is a weight; but it will be understood that the same method of applying the friction is applicable to the pulleys in any of the various classes of lifting devices.

A represents the center, from which arms B C radiate, the arms parallel with each other and arranged in pairs. The distance between the arms at their ends is a little greater than the thickness of the pulleys D, which are arranged between the said arms. Through the arms and pulley an axle, E, is introduced and supported by the arms, on which the pulley freely turns. This axle is best made in the form of a headed screw, as seen in Fig. 1, threaded for a short distance from its end. The one arm or cheek, C, is drilled and tapped corresponding to the thread of the screw, and so that the screw introduced through the opposite arm or cheek and through the pulley will take a firm bearing in the arm C. Through the other arm or cheek, B, the opening *a*, through which the axle extends, is somewhat larger in diameter than the body of the axle or screw. Around the body of the screw and inside its head a helical or other suitable spring, *b*, is introduced, its external diameter corresponding substantially to the opening through the arm, and so that the helical spring passing through the opening *a*, one end will rest against the side of the pulley and the other against the head of the screw, and so that by turning the screw the pressure of the spring upon the pulley may be varied according to the direction in which the screw is turned. If a greater friction is required, then the spring is compressed to a greater extent; if less, the reverse. Preferably I introduce between the end of the spring and the pulley a disk, d, to rest against the side of the pulley, and so that the spring bearing upon the outside of the disk will compress the disk against the pulley to create the friction thereon. Preferably I also provide a jam-nut, e, on the end of the screw, so that when the proper adjustment is attained the nut may be turned to a hard bearing, and thereby hold the screw or axle to prevent its rotation with the pulley; yet a close-fitting thread on the screw itself in the arm will usually be sufficient. The spring b, substantially fitting, as it does, the opening in the arm B, takes a bearing therein, and the body of the screw, corresponding substantially to the internal diameter of the spring, takes a bearing within the spring, so that while there is sufficient freedom for the working of the spring that end of the axle is properly supported in its bearing.

Thus far I have illustrated the invention as a screw threaded at its tip end and the adjustment of the spring made by the head of the screw; but it will be evident that the screw may be threaded under this head and screwed into the arm upon that side, the spring applied at the other end and adjusted by the nut, as seen in Fig. 3. In this modification I have shown the axle as constructed with a screw-thread immediately under the head; but any mechanical device may be employed to engage the body of the screw with the cheek or cheeks to prevent the rotation of the axle—as, for illustration, making the body of the axle at the bearing angular, as seen in Fig. 4—it only being essential that the axle shall take a bearing in one cheek so as to prevent its rotation under the modification illustrated. I therefore do not wish to be understood as limiting my invention to the particular position of the spring, it only being essential that it shall surround the body of the axle within the bearing, and extend through that bearing, one end taking a bearing substantially against the pulley and the other against an adjustable part of the axle.

While I have described the invention as for a lamp-hanger, it will be understood that it is applicable to lifting devices of similar character for general purposes.

I am aware that a pulley has been arranged upon a screw as a pivot, the said screw adjustable longitudinally in a curtain-roll, with a spring between the head of the screw and the surface of the pulley, the said spring adapted to produce an adjustable friction upon said pulley, as in Patent No. 103,084; but the said spring has no part or office in forming a bearing or support for the axle. I am also aware that a similar spring and screw have been arranged through a bearing to produce friction upon a roll; but in that case the bearing or support for the roll or pulley is a part of the pulley itself independent of the spring, and is supported the same, whether or not the spring be present, whereas in this application the pulley is arranged between two arms, the adjusting-screw extending through both arms and through the pulley, the spring arranged around the screw and in an opening in the arm corresponding in diameter to the spring, and so that the spring surrounding the screw forms a bearing or support for the screw, which screw is the axis upon which the pulley revolves. I therefore disclaim anything shown or described in either of the said patents.

I claim—

1. In a hanger provided with pulleys over which the cords or chains run from the lifting power to the thing to be adjusted or lifted, the pulley arranged between cheeks, the axle extending through said cheeks taking a bearing in one of said cheeks, the opening through the other cheek of larger diameter than the body of the axle, and a spring around the axle within the said opening in the cheek, the inner end of said spring bearing against the corresponding face of the pulley, the outer end of the spring against an adjustable part of the axle, substantially as described, and whereby the pressure of the spring upon the pulley may be adjusted.

2. In a hanger substantially such as described, the pulley arranged between a pair of cheeks, the axle extending through said cheeks and pulley, the pulley loose on the axle, the axle taking a bearing in one of the cheeks, the opening through the other cheek of larger diameter than the axle, a spring around the axle extending through the opening, and a disk on the side of the pulley against which one end of said spring rests, the other end of the spring taking a bearing against an adjustable part of the axle, and whereby the pressure of the said spring may be adjusted, substantially as described.

3. In a hanger substantially such as described, the combination of the pulley D, arranged between two cheeks, the axle E, headed at one end and screw-threaded at the other and extending through both cheeks and through the pulley, the end of the axle screw-threaded into the cheek upon that side of the pulley, the opening through the other cheek of larger diameter than the body of the axle, and a spring, b, arranged through said opening and between the head of the axle and the pulley, substantially as described.

DENNIS McMAHON.

Witnesses:
C. D. NEWBURY,
H. S. SAVAGE.